July 2, 1929. G. A. STEINER ET AL Re. 17,352

TOWEL CABINET

Original Filed Feb. 23, 1926 3 Sheets-Sheet 1

Inventors
GEORGE A. STEINER
GOTTFRID OLSON

By Powell, Paul & Moore

ATTORNEYS

July 2, 1929. G. A. STEINER ET AL Re. 17,352

TOWEL CABINET

Original Filed Feb. 23, 1926 3 Sheets-Sheet 2

Inventors
GEORGE A. STEINER
GOTTFRID OLSON
By Paul, Paul & Moore
ATTORNEYS

July 2, 1929. G. A. STEINER ET AL Re. 17,352

TOWEL CABINET

Original Filed Feb. 23, 1926 3 Sheets-Sheet 3

Inventors
GEORGE A. STEINER
GOTTFRID OLSON
By Paul, Paul & Moore
ATTORNEYS

Reissued July 2, 1929. Re. 17,352

UNITED STATES PATENT OFFICE.

GEORGE A. STEINER, OF SALT LAKE CITY, UTAH, AND GOTTFRID OLSON, OF MINNEAPOLIS, MINNESOTA, ASSIGNORS TO STEINER SALES COMPANY, OF SALT LAKE CITY, UTAH, A CORPORATION OF UTAH.

TOWEL CABINET.

Original No. 1,643,095, dated September 20, 1927, Serial No. 89,971, filed February 23, 1926. Application for reissue filed December 3, 1928. Serial No. 323,511.

The towel cabinets such as are used in the toilet rooms of office buildings, hotels, business houses and factories, and public buildings, of various kinds, are supplied with a clean towel or loaded, the expression generally used by those in the business, by the janitor or person in charge of the toilet or washroom, or in some instances by the delivery man of the laundry. These persons usually are very busy, the time for their work is limited, and objection is made to the loading or filling of one of these cabinets with a clean towel after the removal of the soiled one, unless such filling operation can be performed with a minimum expenditure of time and labor. These individuals object particularly if the structure of the cabinet is such that difficulty is experienced in threading or weaving the web of the clean towel through or around the feed rolls, preparatory to making the cabinet effective for the delivery of a section of clean towel to the user.

The primary object of our present invention is to provide a cabinet of such construction that it will be easier for the attendant to fill or load the cabinet than it generally is in cabinets of this kind as heretofore constructed, and there is practically no chance of making an error in the work.

A further object is to simplify the structure of the device and thereby reduce the original cost of manufacture and eliminate as much as possible the danger of breakage and the necessity of repairs.

Other objects of the invention will appear from the following detailed description.

In the accompanying drawings forming part of this specification,

Figure 2:
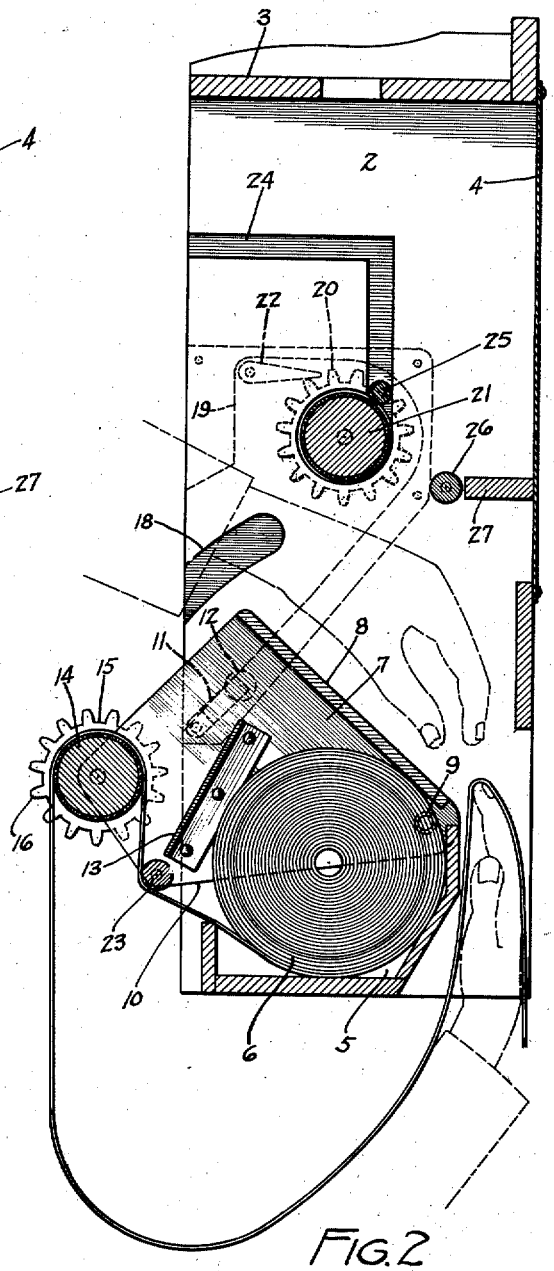
Figure 2 is a similar view showing the feed rolls in their separated position and indicating in dotted lines the position assumed by the hands of the attendant in filling or loading the cabinet.

In the drawings, 2 represents the side walls of the cabinet, 3 the top and 4 the upper portion of the rear wall. 5 is a trough-like receptacle in the lower portion of the cabinet having a comparatively high rear wall and a lower front wall and adapted to receive a roll or fold of clean toweling 6 which rests upon the bottom of the trough, the forward wall of the trough being preferably in the rear slightly of the forward edge of the side walls so that ample space is provided between this wall and the door 5′ of the cabinet, through which space the web of clean towel may hang downwardly below the cabinet in position to be grasped conveniently by the user. Evidently, when a person grasps this depending end and pulls thereon, the clean web of towel will be unwound the length of each delivery depending upon the feed control device as will hereinafter appear. This loading of the cabinet with the roll of clean towel or placing it in the trough, so called, constitutes the first step in the operation of filling the cabinet after the door is opened and its interior exposed. 7 represents plates having a rear connection 8 between them and approximately triangular in form and constitute a shield member for the clean towel supply, this member being pivoted at 9 to the side walls of the cabinet and adapted to swing forwardly through the open front of the cabinet when the door is opened. These plates may be made of metal or any other suitable material and have edges 10 which are engaged and locked by spring snaps 11 mounted on the side walls of the cabinet and adapted to be pressed outwardly into recesses 12 in said side walls by the fingers of the operator after he opens the door and preliminary to the loading or filling operation, the clean towel roll of course being first deposited in its support. When these spring snaps are pressed outwardly, the plates 7 may swing forwardly through the open door of the cabinet as indicated by full lines in Figure 2. The plates are preferably connected by a bridge 13 which is secured at its ends to the plates and holds them rigidly in parallel relation. A feed roll 14 is mounted in the upper portion of said plates and a gear wheel 15 having wedge-faced teeth 16 is secured to the axis of said roll to revolve therewith. Preferably, a stub 17 is mounted on one end of the roll and projects through the adjacent plate 7 and through a curved slot 18 provided in the side wall of the cabinet and on this stud the hub of the gear 15 is secured. The opposite end of the roll has merely a short bearing in the adjacent plate on that side and when, therefore, the spring snaps are released the geared roll with the plates may tip forwardly out of the cabinet to the position indicated by full lines in Figure 2. The gear 15 is preferably arranged within a recess 19 in the side wall of the casing and is adapted to mesh with a similar gear 20 on a feed roll 21 that is mounted in bearings in the side walls of the cabinet above and in parallel relation with the feed roll 14.

When the cabinet is closed, these rolls will be intergeared so that they will have the same surface or peripheral speed, being of the same diameter, the wedge-face of the gear teeth allowing the intermeshing of the gears whenever they are brought together, after the loading of the cabinet and the return of the movable feed roll to its normal feeding position. Backward movement of the gears is prevented by a dog 22 mounted to engage the teeth of the gears 20. A tension roll 23 is mounted between the plates 13 adjacent the edges 10 thereof and when the plates 7 are released and allowed to tilt forward to the position indicated in Figure 2, the attendant will take the loose end of the web of clean towel and pass it up, over and around the roughened surface of the feed roll 14, the roll 23 serving to hold the web downwardly and smooth and straighten it as it approaches the feed roll. The attendant having withdrawn the desired amount of towel web from the roll will pass the loose end up in the rear of the clean roll, holding it in the hand as indicated by dotted lines in Figure 2. Then the other hand will be thrust into the space between the upper portion of the plates 13 and the feed roll 21, this space being sufficiently wide and roomy to allow the attendant to easily thrust his hand therein and grasp the loose end of the clean towel web.

Figure 1:
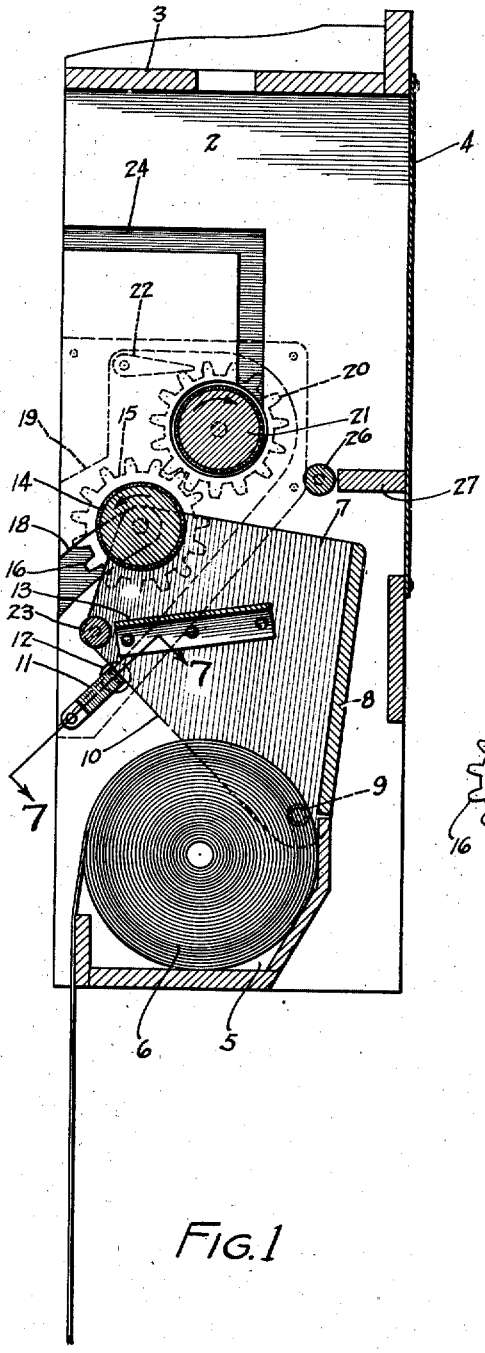
Figure 1 is a vertical sectional view through a towel cabinet embodying our invention showing the position of the clean towel roll when it is first deposited or inserted into the cabinet.

The upper portion of the side walls of the cabinet has grooves 24 therein adapted to receive a spindle or tube forming a takeup roll 25 that is thrust into the forward ends of the grooves and allowed to drop by gravity in the vertical portion thereof into contact with the roughened surface of the feed roll 21. The attendant having threaded the web of clean towel up through the passage at the rear of the cabinet will wrap the loose end of the web around the spindle 25 and preferably a tension roll 26 is provided adjacent the roll 21 and near the edge of a horizontal wall 27 to serve as a guiding means for the soiled towel and smooth and straighten it preparatory to its being wound on the stick or spindle 25. The upper edge of the wall 8 is preferably rounded as shown in Figure 1 and is slightly in the rear of the roll 26 so that it serves as a guiding and smoothing means for the towel web when the cabinet is closed. This wall also prevents any possibility of the soiled towel web coming in contact with the clean web and infecting or contaminating it in any way. The clean roll and the clean web are at all times positively prevented from contact with the soiled web.

In a device of this kind, it is desirable to provide a measuring device or a means by which the operation of the cabinet can positively be checked when a predetermined length of clean towel has been delivered. The person using a cabinet of this kind is usually in a hurry and while willing to make a single manual movement to release the cabinet with one hand and pull out the clean web of towel with the other, is unwilling to do any more than that, and consequently in this device we provide a feed regulating mechanism which may be released with one hand and then in its subsequent operation of permitting feed of the web and checking its feed, when a predetermined length has been delivered, will be automatic. This device corresponds substantially to the feed control mechanism shown in the application of Gottfrid Olson, Serial #76,528, filed December 19, 1925, and we do not make claim to the same herein except in connection with specific features of this cabinet not shown in the Olson application referred to.

Figure 5:
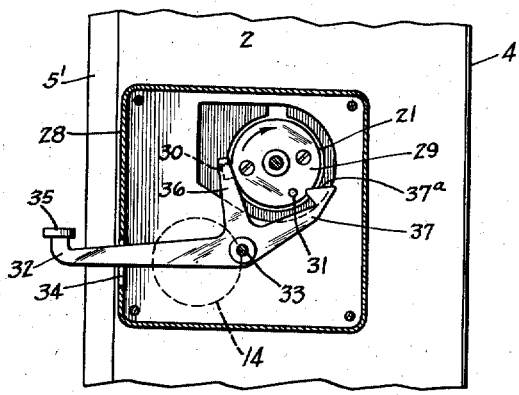
Figure 5 is a detail sectional view on the line 5—5 of Figure 4 showing the measuring device in its normal position.
Figure 6:
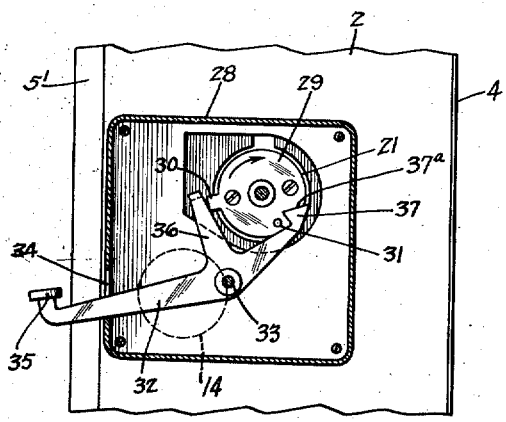
Figure 6 is a view corresponding to Figure 5 showing the measuring device tripped or released to allow a revolution of the feed roll.
Figure 7:
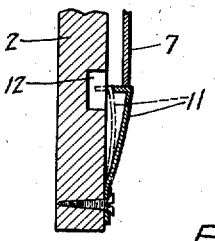
Figure 7 is a sectional view on the line 7—7 of Figure 1.
Figure 4:
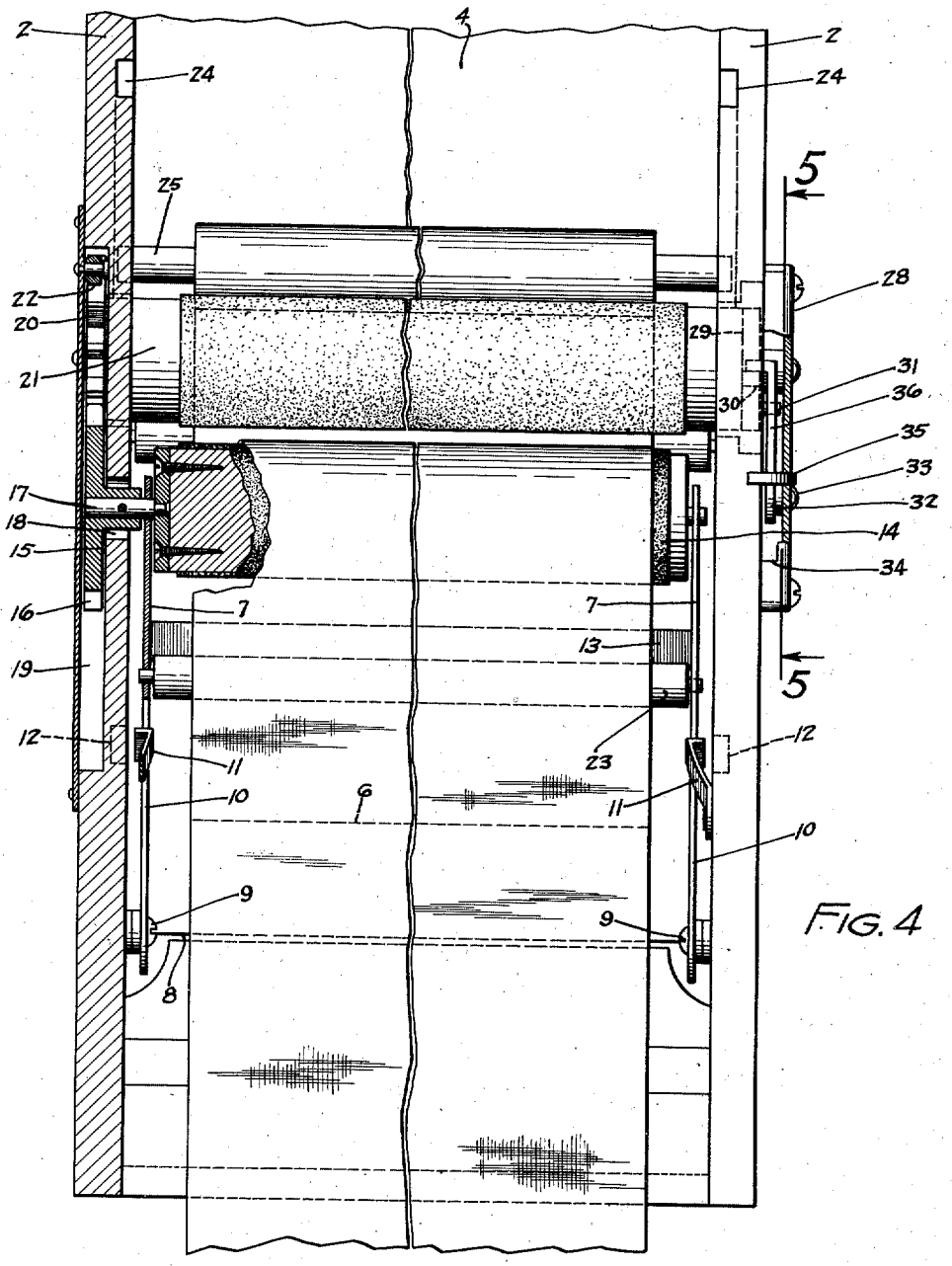
Figure 4 is a front view of the cabinet partially in section showing the manner of mounting the feed rolls therein.

Referring to Figures 5 and 6, 28 represents a housing including the end of the feed roll 21. A plate 29 is secured to the end of the roll and is provided with a lug 30 projecting outwardly from its periphery and a pin 31. A lever 32 is pivoted at 33 and projects outwardly through a slot 34 in the wall of the housing and has a finger piece 35. This lever is provided with arms 36 and 37. The arm 36 projects inwardly into the path of the lug 30 as the roll is revolved and normally when the lever stands in the position as shown in Figure 5, this inwardly projecting end of the lever 36 will stand across the path of the lug 30 and positively prevent revolution of the feed rolls in the direction of the arrows of Figures 5 and 6. As soon, however, as the user of the towel forces the lever 32 down to the position indicated by full lines in Figure 6, the lever 36 will be disengaged from the lug 30 and will stand clear of this lug as shown clearly in Figure 6, and thereupon revolution of the roll is permitted, the lug 30 passing the end of the arm 37 without disturbing it from its raised position. This arm is provided with a beveled face 37[a] which, when the lever 32 is depressed, is moved to a point in the path of the pin 31 so that when the pin strikes this beveled face 37[a], it will return the lever 32 to its normal raised position and swing the arm 36 inwardly into the path of the lug 30 before the lug reaches a point opposite the end of the arm and thereupon the revolution of the rolls will be positively checked.

Figure 3:
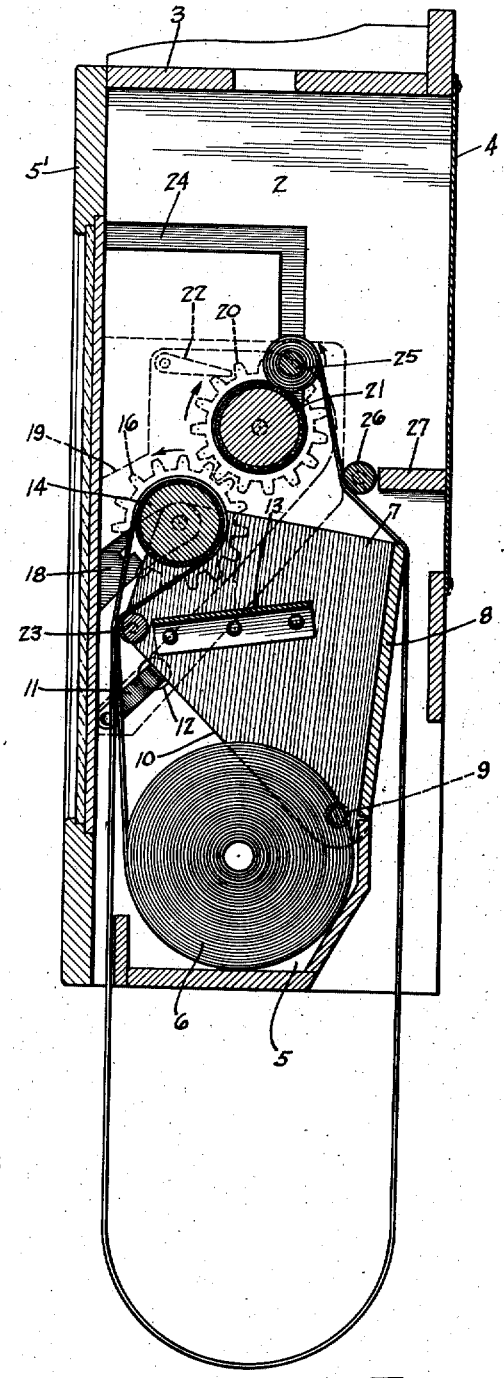
Figure 3 is a view corresponding to Figure 1 showing the cabinet filled or loaded and ready for use.

The length of clean towel delivered will depend upon the diameter of the feed rolls, provision being here made, preferably, for a complete revolution of the rolls. The user can of course if he wishes depress the lever 32 a second time and deliver another length of clean towel, but generally one feed of the towel is sufficient for all purposes and as this clean web is fed downwardly between the door and the roll of clean towel it is positively prevented from coming in contact with the soiled web that is passing upwardly at the back of the cabinet and hence infection of the clean web from the soiled portion is impossible. It will be understood of course that as soon as the attendant has threaded the web of towel over the lower feed roll and wrapped it around the spindle of the soiled towel roll, he will raise the plates 13 and the lower feed roll to the position indicated by full lines in Figure 3 and thereupon may close the door and the cabinet will be ready for use. Such use may continue until the roll of clean towel is exhausted.

We claim as our invention:

1. A towel cabinet having a support therein for a towel supply, a soiled towel takeup roll around which the web of soiled towel may be wound, a feed roll therefor, a second feed roll normally intergeared with said first-named feed roll to have substantially the same peripheral speed and receive the web of clean towel for delivery downwardly to the user, a support for said second feed roll movably mounted whereby said second feed roll is adapted to be moved out of gear engagement with said first-named roll to provide a space between them through which the hand of the operator may be inserted to grasp the loose end of the towel web and deliver it to said take-up roll.

2. A towel cabinet having a support for a clean towel supply therein, a takeup roll adapted to receive the web of soiled towel, a feed roll for contact with the web of soiled towel, a second feed roll having a gear connection with said first named roll for simultaneous movement and over which second feed roll the web of clean towel may be passed for delivery downwardly to the user, said feed rolls being movably mounted whereby one of said rolls is adapted for movement to break the gear connection between said rolls for separation to provide sufficient space between them for the insertion of the operator's hand to reach the loose end of the web of towel at the rear of the cabinet and deliver it to said takeup roll.

3. A towel cabinet having a support for a clean towel supply therein, a takeup roll for the soiled towel, a feed roll adapted to operate said takeup roll to wind the soiled towel thereon, a shield member above the clean towel, a feed roll having a driving connection with said takeup feed roll and pivoted in said shield member, means for permitting said shield and said second feed roll to have an outward movement to disengage said feed rolls one from the other, the space so formed between said feed rolls allowing the convenient insertion of the hand to grasp the loose end of the towel web and draw it upwardly to the takeup roll.

4. A towel cabinet having a support for a clean towel supply therein, a soiled towel takeup roll, a feed roll adapted to engage the web of soiled towel, and wind it on said takeup roll, a shield mounted above said clean towel, means permitting said shield to tilt forwardly, a second feed roll supported by said shield and having a driving connection with said first-named feed roll and over which the web of clean towel is extended to depend therefrom below the cabinet, said shield when tilted allowing the separation of said feed rolls and providing an opening between them through which the hand of the operator may be inserted to grasp the loose end of the towel web for delivery to the takeup roll.

5. A towel cabinet having a support for a supply of clean towel, a takeup roll whereon the web of soiled towel is wound, a feed roll for said takeup roll, a second feed roll having a driving connection with said first-named roll and over which the web of clean towel may be passed for delivery downward to the user, a carrier for said second feed roll, and means for normally holding it in its raised position, means permitting said carrier when released to tilt and allow separation of said feed rolls to provide room between them for the insertion of the hand.

6. A towel cabinet having a support for a supply of clean towel, a takeup roll whereon the web of soiled towel may be wound, a feed roll for said takeup roll, a second feed roll having a driving connection with said first-named roll and over which the web of clean towel may be passed for delivery downwardly to the user, a carrier for said second feed roll, and means for normally holding it in its raised position, means permitting said carrier when released to tilt and allow separation of said feed rolls to provide room between them for the insertion of the hand, said carrier having a rear wall over which the web of towel slides and is smoothed in its movement to said takeup roll.

7. A towel cabinet having a support for a supply of clean towel, a takeup roll for the soiled towel and a feed roll therefor, a shield pivoted at its lower portion and normally locked and adapted to tilt forwardly when released, said shield comprising side and rear walls, a second feed roll mounted in said side walls and intergeared with said first-named roll for simultaneous operation and over which second feed roll the web of clean towel passes and thence downward to the user, means permitting said shield when released to tilt forwardly and allow the separation of said rolls to provide a space for the operator's hand between them for drawing the loose end of the towel web upwardly to said takeup roll.

8. A towel cabinet adapted to receive a supply of clean towel, a takeup roll and a feed roll therefor, a second feed roll intergeared with said first-named roll, the wall of said cabinet having a slot therein to receive the spindle of said second feed roll, a support for said second feed roll with means permitting it to move outwardly and allow the separation of said feed rolls one from the other, the spindle of said second feed roll moving in said slot and providing a gap or opening between said feed rolls through which the hand of the operator may be inserted for the purpose specified.

9. A towel cabinet adapted to contain a supply of clean towel, a takeup roll for the soiled towel, and a feed roll therefor, a second feed roll intergeared to said first-named feed roll, a tilting carrier for said second-named feed roll with means permitting it to move forwardly to a point outside of the cabinet when the cabinet door is opened, stops adapted to be released by the attendant and normally holding said tilting carrier in its raised position but permitting it to drop forwardly by gravity when released, and said carrier when released providing ample space between said feed rolls for the insertion of the operator's hand between them for drawing the loose end of the towel web upwardly to said takeup roll.

10. A towel cabinet adapted to contain a supply of clean towel therein, a soiled towel takeup roll, a feed roll adapted to engage the web of soiled towel and wind it on said takeup roll, a guard comprising side plates and a rear wall pivotally supported above the clean towel and below said takeup feed roll, suitable stops for normally holding said guard in its raised position, and in contact with the loose web of towel, said guard being adapted when released to swing outwardly to a position outside of the cabinet, a second feed roll mounted in said guard and having a driving connection with said first-named feed roll and over which second feed roll the web of clean towel may be passed and directed downwardly below the cabinet to a point where it can be reached by the user, the pull of the user on the clean towel operating said second feed roll and through it said first-named feed roll and said takeup roll, the separation of said feed rolls allowing sufficient space between them to permit the insertion of one hand to grasp the loose web of towel interposed in the space between the clean towel and the rear of the cabinet.

11. A towel cabinet adapted to receive a supply of clean towel, a feed roll over which the web of clean towel may be passed downwardly to the user, a takeup roll and a feed roll therefor geared to said first-named feed roll to be driven thereby, the loose end of the towel web being adapted to be carried upwardly in the rear of the clean towel to said takeup roll, a movable shield for the clean towel between which shield and the rear of the cabinet the web of towel may be stretched, and means permitting said first-named feed roll to be moved to a point outside the towel cabinet for convenience in placing the web of clean towel thereon.

12. A towel cabinet adapted to receive a supply of clean towel, a feed roll over which the web of clean towel passes downwardly to the user, a takeup roll and a feed roll therefor geared to said first named feed roll to be driven thereby, the loose end of the towel web being adapted to be carried upwardly in the rear of the clean towel to said takeup roll, a movable shield for the clean towel between which guard and the rear of the cabinet the web of towel may be stretched, and means permitting said first-named feed roll to be moved to a point out of driving connection with said takeup feed roll to allow convenient placing of the towel web on said first-named roll.

13. A towel cabinet comprising outer and inner sections having substantially open fronts, a closure member for the rear of the inner section, and means including a receiving instrumentality whereby toweling may be fed from said inner section downwardly in front of said cabinet and thence upwardly in the rear of said member to said instrumentality.

14. A towel cabinet comprising outer and inner sections having substantially open fronts, devices for permitting the inner section to be moved forwardly to provide a hand receiving gap in the rear thereof, a closure member for the rear of the inner section separating the clean and soiled towel and means including a receiving instrumentality, whereby toweling may be fed from said inner section downwardly in the front of said cabinet and thence upwardly in the rear of said member to said instrumentality.

15. A towel cabinet comprising outer and inner sections having substantially open fronts, a closure member for the rear of the inner section, means for permitting said inner action to be moved relatively to the outer section a feed roll mounted in said inner section, a take up roll mounted adjacent the feed roll, driving means between said rolls, the relative movement of said closure member and outer section adapting said first named feed roll for convenient stretching of the clean web thereover, and the convenient carrying of the loose end of the web up between the closure of the inner section and the rear wall of the outer section to said take up roll.

16. A towel cabinet comprising inner and outer sections, one section having a closure adapted to separate the clean and soiled towel portions and preventing contact therebetween, devices for permitting relative movement of said closure and said outer section to provide a hand receiving gap between the rear of the closure and outer section, and means including a receiving instrumentality whereby toweling may be fed downwardly in the front of said cabinet to a position convenient for use and thence upwardly in the rear of said closure to said instrumentality.

17. A towel cabinet comprising relatively movable sections, one section having a closure adapted to separate the clean and soiled towel portions and prevent contact therebetween, a feeding instrumentality mounted in said closure section over which the clean towel may be stretched from a towel supply, devices for permitting relative movement of said closure section and the other section to adjust said feeding instrumentality in a position for convenient access and provide a hand-receiving gap between the sections, and means including a receiving instrumentality for the soiled towel whereby clean toweling may be fed downwardly in the front of the cabinet from said feeding instrumentality to a position convenient for use and thence upwardly through said gap in the rear of said closure to said receiving instrumentality.

18. A towel cabinet adapted to receive a supply of clean towel and comprising outer and inner sections, delivery and take up feed rolls having a driving connection between them for simultaneous movement and mounted in said cabinet, a take up roll for the soiled towel supported to contact with said take up feed roll, the inner and outer sections being located to provide a gap between the inner section and the rear wall of the outer section through which the web of soiled towel may be stretched to said take up roll, the rear of said inner section having a closure for separating the clean portion of the towel from the soiled portion thereof, said closure having means to permit its forward movement to temporarily enlarge said gap and allow insertion of the hand in stretching the web to said take up roll.

19. A towel cabinet comprising outer and inner sections, the outer section having an opening in its bottom, the inner section having an open front and substantially closed rear portion to separate the clean from the soiled towel, a delivery roll mounted in the inner section, a take up roll in said outer section, instrumentalities permitting the said closed rear portion of the inner section to move forwardly with respect to said outer section, the arrangement being such as to permit toweling to be fed downwardly in front of both of said sections and thence upwardly through the opening in the bottom of said outer section in the rear of the closed rear portion of said inner section to the said take up roll.

20. A towel cabinet adapted to receive a supply of clean towel and comprising outer and inner sections, delivery and take up feed rolls having a driving connection between them for simultaneous movement and mounted in said cabinet, a take up roll for the soiled towel supported to contact with said take up feed roll, the inner and outer sections being located to provide a gap between the inner section and the rear wall of the outer section through which the web of soiled towel may be stretched to said take up roll, the rear of said inner section having a closure for separating the clean portion of the towel from the soiled portion thereof, said closure having means to permit its forward movement to temporarily enlarge said gap and allow insertion of the hand in stretching the web to said take up roll, and a tension device in said cabinet adjacent said take up feed roll and engaging the towel web.

In witness whereof, we have hereunto set our hands, George A. Steiner at Salt Lake City, State of Utah, this 19th day of November, 1928, and Gottfrid Olson at Minneapolis, Hennepin County, Minnesota, this 30th day of November, 1928.

GEORGE A. STEINER.
GOTTFRID OLSON.